United States Patent
Graziosi et al.

(10) Patent No.: US 12,482,187 B2
(45) Date of Patent: Nov. 25, 2025

(54) V3C SYNTAX NEW BASEMESH PATCH DATA UNIT

(71) Applicants: SONY GROUP CORPORATION, Tokyo (JP); Sony Corporation of America, New York, NY (US)

(72) Inventors: Danillo Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 182 days.

(21) Appl. No.: 18/368,511

(22) Filed: Sep. 14, 2023

(65) Prior Publication Data

US 2024/0404200 A1    Dec. 5, 2024

Related U.S. Application Data

(60) Provisional application No. 63/505,165, filed on May 31, 2023.

(51) Int. Cl.
*G06T 17/20* (2006.01)
*G06T 15/04* (2011.01)

(52) U.S. Cl.
CPC .............. *G06T 17/20* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 2006/0066613 A1* | 3/2006 | Elshishiny | G06T 17/20 345/423 |
| 2008/0303840 A1* | 12/2008 | Zhou | G06T 15/04 345/585 |
| 2020/0219286 A1* | 7/2020 | Sinharoy | G06T 7/174 |
| 2023/0290011 A1* | 9/2023 | Kim | G06T 9/004 |
| 2023/0401755 A1* | 12/2023 | Mammou | G06T 9/001 |

* cited by examiner

*Primary Examiner* — Sultana M Zalalee
(74) *Attorney, Agent, or Firm* — Haverstock & Owens, A Law Corporation

(57) ABSTRACT

A new high-level syntax element referred to as a basemesh patch data unit allows the transmission of syntax elements related to the basemesh component of a V3C bitstream. Previously, the V3C standard did not have any additional patches targeting the basemesh only. A basemesh patch data unit works with the previously disclosed sub-patch concept to provide syntax elements to be used with basemesh bitstream. The basemesh patch data unit allows mesh data and other types of data (e.g., point clouds) to be mixed together at the patch level and generate a richer representation of 3D objects. Furthermore, the basemesh patch data unit expands the concept of sub-meshes and patches by providing a flexible way to arrange the data in 3D (at the basemesh level) and in 2D (at the texture map level) allowing different configurations, instance, multiple attribute images and multiple basemeshes.

24 Claims, 6 Drawing Sheets

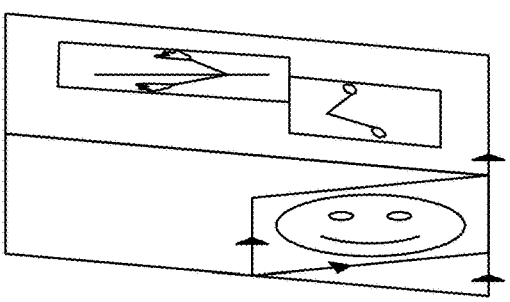

One submesh → one tile
video frame size = WxH
submesh1 texture map size = W1xH1
submesh2 texture map size = W2xH2
Normalization: W1 → W/2, W2 → W/2, H1 → H, H2 → H W = asps_vdmc_ext_attribute_frame_width
H = asps_vdmc_ext_attribute_frame_height afps_vdmc_ext_attribute_single_tile_in_atlas_frame_flag = false
afps_vdmc_ext_attribute_ti_uniform_partition_spacing_flag = true
afps_vdmc_ext_attribute_partition_cols_width_minus1 = (W/2)/64 - 1
afps_vdmc_ext_attribute_partition_cols_height_minus1 = H/64 - 1
afps_vdmc_ext_attribute_single_partition_per_tile_flag = true pdu_attributes_2d_pos_x = 0|0
pdu_attributes_2d_pos_y = 0|0
pdu_attributes_2d_size_x_minus1 = sizeX = W/2|W/2
pdu_attributes_2d_size_y_minus1 = sizeY = H|H GENERAL:
X0 = TileX + pdu_atributes_2d_pos_x
Y0 = TileY + pdu_atributes_2d_pos_y
sizeX = pdu_atributes_size_x_minus1 + 1
sizeY = pdu_atributes_size_y_minus1 + 1
Texel(x,y) = [X0+clamp(floor/ceil(u*(sizeX-1)),0,sizeX-1), Y0+clamp(floor/ceil((1-v)*(sizeY-1)),0,sizeY-1)]

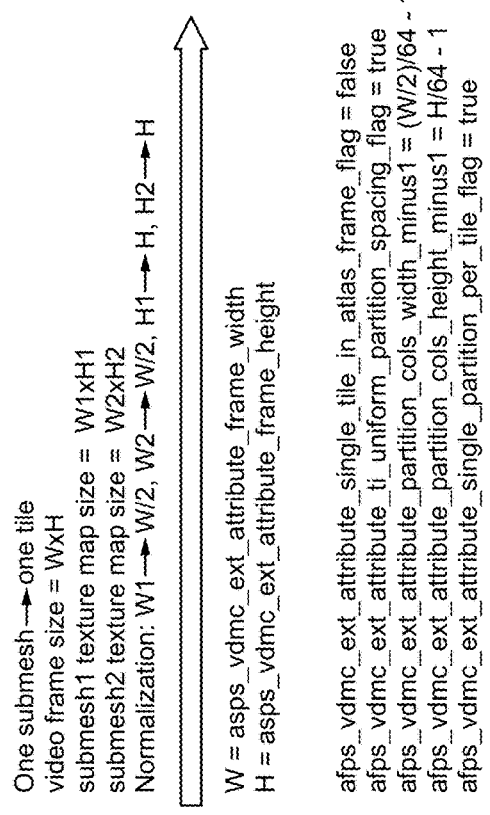

All (u,v) are between [0,1]

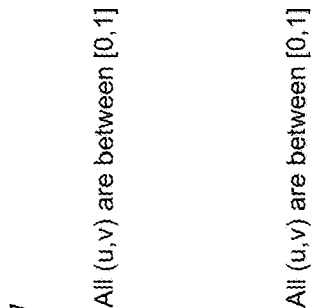

All (u,v) are between [0,1]

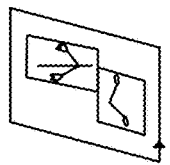

SUBMESH #1: Texel(x,y) = [0+0+clamp(floor/ceil(u*((W/2)-1)),0, (W/2)-1), 0+0+clamp(floor/ceil((1-v)*(H-1)),0, H-1)]
SUBMESH #2: Texel(x,y) = [0+W/2+clamp(floor/ceil(u*((W/2)-1)),0, (W/2)-1), 0+0+clamp(floor/ceil((1-v)*(H-1)),0, H-1)]

Fig. 5

V3C SYNTAX NEW BASEMESH PATCH DATA UNIT

CROSS-REFERENCE TO RELATED APPLICATION(S)

This application claims priority under 35 U.S.C. § 119 (e) of the U.S. Provisional Patent Application Ser. No. 63/505,165, filed May 31, 2023 and titled, "V3C SYNTAX NEW BASEMESH PATCH DATA UNIT," which is hereby incorporated by reference in its entirety for all purposes.

FIELD OF THE INVENTION

The present invention relates to three dimensional graphics. More specifically, the present invention relates to the V3C syntax.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is no mechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

UVAtlas from Microsoft is the state-of-the-art automatic texture map generation, but requires a significant amount of time, and does optimization for a local frame only. V-PCC generates patches using orthographic projections, but targets point clouds only, so it does not address patch generation for meshes.

SUMMARY OF THE INVENTION

A new high-level syntax element referred to as a basemesh patch data unit allows the transmission of syntax elements related to the basemesh component of a V3C bitstream. Previously, the V3C standard did not have any additional patches targeting the basemesh only. A basemesh patch data unit works with the previously disclosed sub-patch concept to provide syntax elements to be used with basemesh bitstream. The basemesh patch data unit allows mesh data and other types of data (e.g., point clouds) to be mixed together at the patch level and generate a richer representation of 3D objects. Furthermore, the basemesh patch data unit expands the concept of sub-meshes and patches by providing a flexible way to arrange the data in 3D (at the basemesh level) and in 2D (at the texture map level) allowing different configurations, instance, multiple attribute images and multiple basemeshes.

In one aspect, a method programmed in a non-transitory memory of a device comprises transmitting parameters for a basemesh bitstream, transmitting texture parameterization parameters and transmitting content of different types. Transmitting the texture parameterization parameters includes using sub-patches. The method further comprises transmitting geometry refinement parameters. The content of different types include point clouds and meshes. The method further comprises mapping parts of a mesh in 3D to a single attribute video. The method further comprises mapping parts of a mesh in 3D to multiple attribute videos. Transmitting the content of different types includes transmitting one or more tiles. Transmitting the content of different types includes transmitting one or more videos. Transmitting the content of different types includes transmitting a plurality of videos, wherein a first video of the plurality of videos is for a first section of the content, and a second video of the plurality of videos is for a second section of the content.

In another aspect, an apparatus comprises a non-transitory memory for storing an application, the application for: transmitting parameters for a basemesh bitstream, transmitting texture parameterization parameters and transmitting content of different types and a processor coupled to the memory, the processor configured for processing the application. Transmitting the texture parameterization parameters includes using sub-patches. The application is further for transmitting geometry refinement parameters. The content of different types include point clouds and meshes. The application is further for mapping parts of a mesh in 3D to a single attribute video. The application is further for mapping parts of a mesh in 3D to multiple attribute videos. Transmitting the content of different types includes transmitting one or more tiles. Transmitting the content of different types includes transmitting one or more videos. Transmitting the content of different types includes transmitting a plurality of videos, wherein a first video of the plurality of videos is for a first section of the content, and a second video of the plurality of videos is for a second section of the content.

In another aspect, a method programmed in a non-transitory memory of a device comprises receiving parameters for a basemesh bitstream, receiving texture parameterization parameters and receiving content of different types. Receiving the texture parameterization parameters includes using sub-patches. The method further comprises receiving geometry refinement parameters. The content of different types include point clouds and meshes. The method further comprises mapping parts of a mesh in 3D to a single attribute video. The method further comprises mapping parts of a mesh in 3D to multiple attribute videos. Receiving the content of different types includes transmitting one or more tiles. Receiving the content of different types includes transmitting one or more videos. Receiving the content of different types includes transmitting a plurality of videos, wherein a first video of the plurality of videos is for a first section of the content, and a second video of the plurality of videos is for a second section of the content.

BRIEF DESCRIPTION OF THE DRAWINGS

FIG. 5 illustrates a diagram of color transfer according to some embodiments.

DETAILED DESCRIPTION OF THE PREFERRED EMBODIMENT

Figure 1:
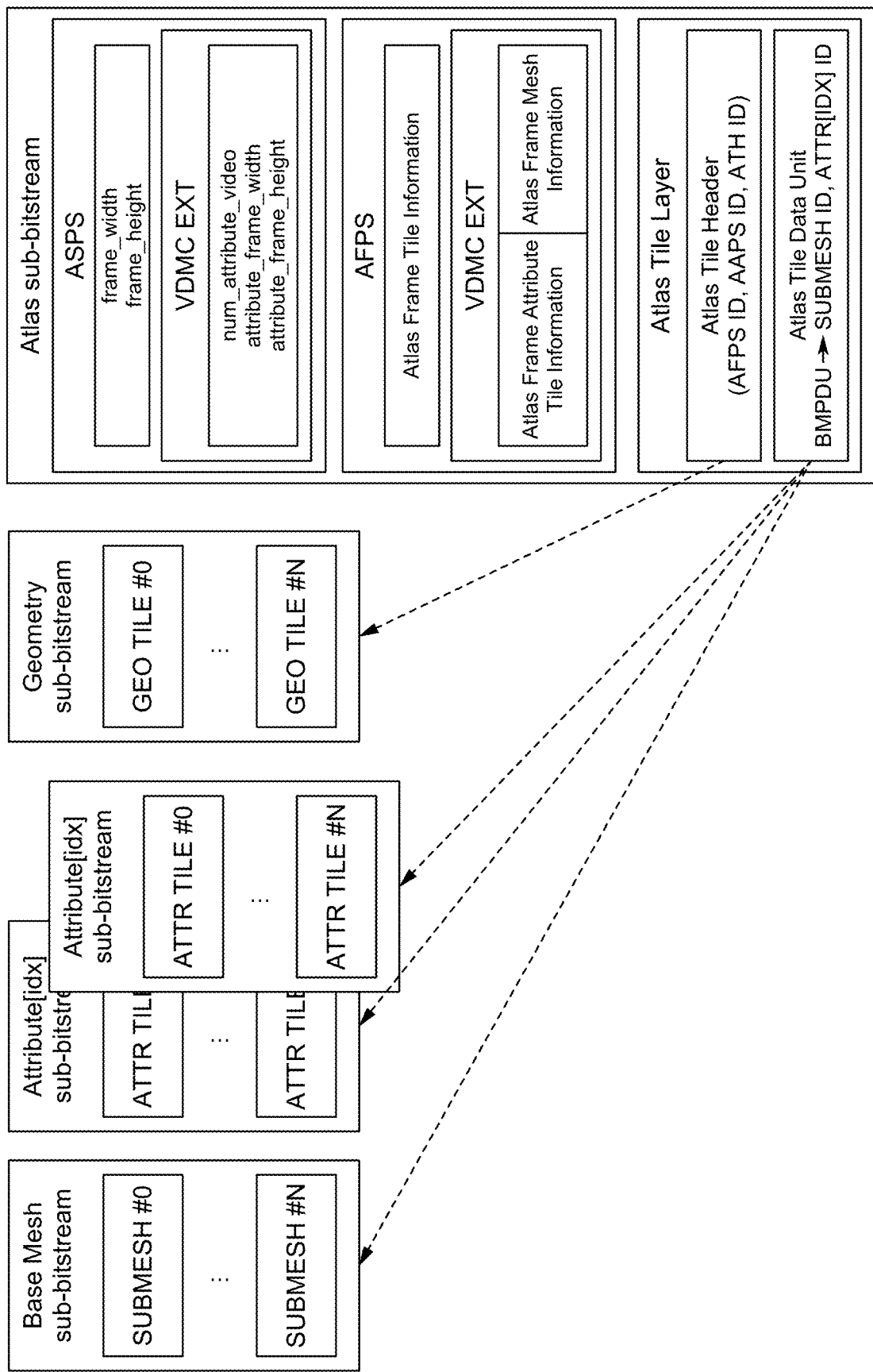
FIG. 1 illustrates a diagram of the mapping between the information conveyed by each sub-bitstream using the tile information according to some embodiments.

Meshes are composed of a set of polygons usually describing a surface of a volume. An efficient way to describe the surface properties of a mesh (for instance, its color characteristics) is to generate a texture atlas that maps the properties of the 3D surface onto a 2D surface. The result of the mapping function is stored in (u,v) coordinates and added to the mesh data, which is then further encoded with a mesh compression approach. However, the presence of (u,v) coordinates can significantly increase the size of the compressed meshes.

In the latest international point cloud compression standard V-PCC, depth map images are generated for point clouds using orthographic projections. The parameters of the projection are then encoded in a metadata bitstream known as the atlas bitstream, so the decoder receives those parameters and applies the mapping function to each (u,v) coordinate of the depth map to then reconstruct the 3D information.

An additional patch data unit for the current V3C standard to include syntax elements that affect the basemesh processing, for instance, allowing the transmission of the parameters for generating mapping coordinates for meshes using orthographic projections and geometry refinement parameters is described herein.

The new patch data unit type, the basemesh patch data unit, adds a new patch data type to the existing patch data types present in the V3C standard. The new patch data type utilizes the concept of sub-patches as discussed in U.S. patent application Ser. No. 18/115,386, filed Feb. 28, 2023, and titled: V3C SYNTAX EXTENSION FOR MESH COMPRESSION USING SUB-PATCHES and U.S. patent application Ser. No. 18/114,905, filed Feb. 27, 2023, and titled: ORTHOATLAS: TEXTURE MAP GENERATION FOR DYNAMIC MESHES USING ORTHOGRAPHIC PROJECTIONS, which are incorporated by reference herein, to transmit texture parameterization parameters and can also carry other syntax elements related to the basemesh, such as geometry refinement parameters. The additional patch data unit also allows the standard to seamlessly mix content of different types, such as point clouds and meshes.

An extension of the V3C syntax with new syntax elements enables efficient encoding of dynamic meshes, in particular the addition of a new patch data unit type, that allows for further processing of the received basemesh.

The syntax elements described herein enable encoding dynamic meshes using the V3C standard. A new high-level syntax element called the basemesh patch data unit allows the transmission of syntax elements related to the basemesh component of a V3C bitstream. Previously, the V3C standard did not have any additional patches targeting the basemesh only. A basemesh patch data unit works with the previously described sub-patch concept to provide syntax elements to be used with basemesh bitstream. It allows mesh data and other types of data (e.g., point clouds) to be mixed together at the patch level and generate a richer representation of 3D objects. Furthermore, it expands the concept of sub-meshes and patches by providing a flexible way to arrange the data in 3D (at the basemesh level) and in 2D (at the texture map level), allowing different configurations, such as multiple attribute images and multiple basemeshes.

The syntax can be used to transmit parameters for the basemesh bitstream, and allows better integration with current V3C syntax elements currently being used for other data types, such as point cloud encoding. Additionally, the syntax uses the concept of sub-patches to transmit texture parameterization information for the basemesh, and allows a flexible data arrangement in 2D and in 3D, with different mappings for the texture location in 2D and for the face mapping in 3D.

The previous high-level syntax in discussion only allows multiple sub-meshes concatenated into a single texture map image. With the concept described herein, the syntax is flexible enough that parts of the mesh in 3D can be mapped to single or even multiple attribute videos. Furthermore, the content can also be mixed with legacy V3C patches (for instance, patches used for point clouds).

The mesh patches are patch structures used to indicate metadata information related to coded mesh data being transmitted using V3C sub-bitstreams. In the case of V-DMC, the mesh patch unit can relate to data in the geometry bitstream (e.g., indicating the position of sub-mesh coefficients), attribute bitstream (e.g., sending projection parameters for atlas textures generated with orthoAtlas), or base mesh bitstream (e.g., indicating the sub-mesh that is related to a set of displacement coefficients in the geometry sub-bitstream and a set of projection parameters for images in attribute sub-bitstream for orthoAtlas). This is different from the existing patches in V3C, which do not contain the relationship with mesh data, only video sub-bitstreams. However, having them co-existing supports the case when point clouds and meshes are mixed.

FIG. 1 illustrates a diagram of the mapping between the information conveyed by each sub-bitstream using the tile information according to some embodiments. The legacy tile information inherited from the V3C structure is related to the geometry bitstream only. In V-PCC, the tile information is applied equally to geometry, occupancy, and attributes, since it is assumed that they contain the same structure, but in the case of V-DMC, this is not enforced, and attribute and geometry do not therefore present the same structure anymore. Additionally, a new sub-bitstream, the basemesh bitstream, is included and can be divided into sub-meshes. In that case, new tiling structures are transmitted for the various attributes and sub-meshes. Furthermore, the patch in V3C relates to the tiles by using the ID present in the atlas tile header. Since for V-DMC, this is only related to the geometry sub-bitstream, the references to the attributes and sub-meshes are added in the patch structure itself.

Patches can also refer to the entirety of the tile or just a certain part of it. For instance, in the current CTC anchor, the mesh patch relates to the entire geometry bitstream, but in the case of sub-meshes, the patch will only refer to parts of the sub-bitstream. This relationship can be explicitly transmitted in the patch data unit, as is being done in TMMv4.1, or the tile information can be used instead. A new base mesh patch data unit is able to be used that allows for a more efficient transmission of parameters. It is also capable of attending new requirements, such as multiple attributes. For instance, the patch is related only to a subset of attributes and attribute tiles, so that the patch may only be described to a certain area inside a selected number of attribute videos.

The V3C standard has a video track for geometry, a video track for attributes, a video track for texture maps, and a video track for the basemesh. A metadata bitstream uses the concept of patches to connect the aspects (e.g., geometry, attributes, texture, basemesh) together.

For example, for X basemesh, Y area of the image is used, or for B basemesh, C and D parameters are introduced to generate texture coordinates. Each patch is similar to a mapping indicating where the data can be found. For example, in the syntax, there is able to be information for mesh mapping, attribute video mapping, sub-patch information (e.g., parameters for projection), and a geometry video mapping. The mapping information is then available in the bitstream.

The base mesh patch data unit syntax and semantics are included herein.

| | Descriptor |
|---|---|
| basemesh_patch_data_unit( tileID, patchIdx ) { | |
|   bmpdu_submesh_id[ tileID ][ patchIdx ] | u(v) |
|   smIdx = SubMeshIDToIndex[ bmpdu_submesh_id[ tileID ][ patchIdx ]] | |
|   bmpdu_geometry_full_occupancy_flag[ tileID ][ patchIdx ] | u(1) |
|   if( !bmpdu_geometry_full_occupancy_flag[ tileID ][ patchIdx ]){ | |
|     bmpdu_geometry_2d_pos_x[ tileID ][ patchIdx ] | ue(v) |
|     bmpdu_geometry_2d_pos_y[ tileID ][ patchIdx ] | ue(v) |
|     bmpdu_geometry_2d_size_x_minus1[ tileID ][ patchIdx ] | ue(v) |
|     bmpdu_geometry_2d_size_y_minus1[ tileID ][ patchIdx ] | ue(v) |
|   } | |
|   for(attrIdx = 0; attrIdx < asps_vdmc_ext_num_attribute_video; attrIdx++ ){ | |
|     bmpdu_attribute_patch_present_flag[ tileID ][ patchIdx ][ attrIdx ] | u(1) |
|     if( bmpdu_attribute_patch_present_flag[ tileID ][ patchIdx ][ attrIdx ]){ | |
|       bmpdu_attribute_tile_id[ tileID ][ patchIdx ][ attrIdx ] | u(v) |
|       attrTileIdx = TileIDToIndexAtt[bmpdu_attribute_tile_id[ tileID ][ patchIdx ][ attrIdx ]] | |
|       bmpdu_attribute_full_occupancy_flag[ tileID ][ patchIdx ][ attrIdx ][ attrTileIdx ] | u(1) |
|       if( !bmpdu_attribute_full_occupancy_flag[ tileID ][ patchIdx ][ attrIdx ][ attrTileIdx ]){ | |
|         bmpdu_attribute_2d_pos_x[ tileID ][ patchIdx ][ attrIdx ][ attrTileIdx ] | ue(v) |
|         bmpdu_attribute_2d_pos_y[ tileID ][ patchIdx ][ attrIdx ][ attrTileIdx ] | ue(v) |
|         bmpdu_attribute_2d_size_x_minus1[ tileID ][ patchIdx ][ attrIdx ][ attrTileIdx ] | ue(v) |
|         bmpdu_attribute_2d_size_y_minus1[ tileID ][ patchIdx ][ attrIdx ][ attrTileIdx ] | ue(v) |
|       } | |
|     } | |
|   } | |
|   if( afps_vdmc_ext_projection_texcoord_present_flag[ smIdx ]){ | |
|     bmpdu_faceID_to_subPatchIdx_identity_mapping_flag[ tileID ][ patchIdx ] | u(1) |
|     bmpdu_projection_texcoord_frame_scale[ tileID ][ patchIdx ] | fl(64) |
|     bmpdu_projection_texcoord_faceID_count_minus_1[ tileID ][ patchIdx ] | |
|     numSubPatches = bmpdu_projection_texcoord_faceID_count_minus1[ tileID ][ patchIdx ] + 1 | |
|     for( i = 0; i < numSubPatches; i++){ | |
|       if( !bmpdu_faceID_to_subPatchIdx_identify_flag[ tileID ][ patchIdx ]) | |
|         bmpdu_faceID_to_subPatchIdx[ tileID ][ patchIdx ][ i ] | ue(v) |
|       bmpdu_projection_texcoord projection_id[ tileID ][ patchIdx ][ i ] | u(v) |
|       bmpdu_projection_texcoord_orientation_id[ tileID ] | |

| | Descriptor |
|---|---|
| [ patchIdx ][ i ] | u(2) |
|     bmpdu_projection_texcoord_2d_pos_x[ tileID ][ patchIdx ][ i ] | ue(v) |
|     bmpdu_projection_texcoord_2d_pos_y[ tileID ][ patchIdx ][ i ] | ue(v) |
|     bmpdu_projection_texcoord_2d_size_x_minus1[ tileID ] | |
| [ patchIdx ][ i ] | ue(v) |
|     bmpdu_projection_texcoord_2d_size_y_minus1[ tileID ] | |
| [ patchIdx ][ i ] | ue(v) |
|     bmpdu_projection_texcoord_scale_present_flag[ tileID ] | |
| [ patchIdx ][ i ] | u(1) |
|     if( bmpdu_projection_texcoord_scale_present_flag[ tileID ] | |
| [ patchIdx ][ i ] ) | |
|         bmpdu_projection_texcoord_subpatch_scale_power_factor | |
| [ tileID ][ patchIdx ][ i ] | ue(v) |
|     } | |
|   } | |
| } | | bmpdu_submesh_id[tileID][patchIdx] indicates the associated submesh id specified in the current patch with index patchIdx, in the current atlas tile with tile ID equal to tileID. The value of bmpdu_submesh_id[tileID][patchIdx] shall be one of afps_ext_vdmc_submesh_id[i] where i is in the range of 0 to afps_ext_vdmc_num_submeshes_minus1, inclusive. bmpdu_geometry_full_occupancy_flag [tileID][patchIdx] equal to 1 specifies that the patch with index patchIdx in the current atlas tile, with tile ID equal to tileID, will occupy the entire tile video frame of the geometry video, with tile ID equal to tileID. If bmpdu_geometry_full_occupancy_flag [tileID][patchIdx] is equal to 0, the patch with index patchIdx in the current atlas tile, with tile ID equal to tileID, will occupy only part of the geometry video. If bmpdu_geometry_full_occupancy_flag [tileID][patchIdx] is not present, it is assumed to be 1. bmpdu_geometry_2d_pos_x [tileID][patchIdx] specifies the x-coordinate of the top-left corner of the bounding box size for the patch with index patchIdx, in the current atlas tile, with tile ID equal to tileID. When bmpdu_geometry_2d_pos_x[tileID][patchIdx] is not present, its values is inferred to be equal to TileOffsetX [tileID]. bmpdu_geometry_2d_pos_y[tileID][patchIdx] specifies the y-coordinate of the top-left corner of the bounding box size for the patch with index patchIdx, in the current atlas tile, with tile ID equal to tileID. When bmpdu_geometry_2d_pos_y[tileID][patchIdx] is not present, its values is inferred to be equal to TileOffsetY[tileID]. bmpdu_geometry_2d_size_x_minus1[tileID][patchIdx] plus 1 specifies the width value of the bounding box size for the patch with index patchIdx, in the current atlas tile, with tile ID equal to tileID. When bmpdu_geometry_2d_size_x_minus1 [tileID][patchIdx] is not present, its values is inferred to be equal to TileWidth [tileID]. bmpdu_geometry_2d_size_y_minus1[tileID] [patchIdx] plus 1 specifies the height value of the bounding box size for the patch with index patchIdx, in the current atlas tile, with tile ID equal to tileID. When bmpdu_geometry_2d_size_y_minus1 [tileID][patchIdx] is not present, its values is inferred to be equal to TileHeight [tileID]. bmpdu_attribute_patch_present_flag[tileID] [patchIdx][attrIdx] equal to 1 specifies that the patch with index patchIdx, in the current atlas tile, with tile ID equal to tileID, is present in the attribute video with index attrIdx. If bmpdu_attribute_patch_present_flag[tileID][patchIdx][attrIdx] is equal to 0, the patch with index patchIdx, in the current atlas tile, with tile ID equal to tileID, is not present in the attribute video with index attrIdx. If bmpdu_attribute_patch_present_flag[tileID][patchIdx][attrIdx] is not present, it is assumed to be 1. bmpdu_attribute_tile_id [tileID][patchIdx][attrIdx] indicates the associated attribute tile ID specified in the current patch with index patchIdx, in the current atlas tile with tile ID equal to tileID, for the attribute video with index attrIdx. The value of bmpdu_attribute_tile_id[tileID][patchIdx] [attrIdx] shall be one of afps_vdmc_ext_attribute_tile_id[attrIdx][i] where i is in the range 0 to afps_vdmc_ext_attribute_num_tiles_in_atlas_frame_minus1[attrIdx], inclusive. bmpdu_attribute_full_occupancy_flag[tileID][patchIdx][attrIdx][attrTileIdx] equal to 1 specifies that the patch with index patchIdx, in the current atlas tile, with tile ID equal to tileID, will occupy the entire tile video frame of the attribute video with index attrIdx and attribute tile index attrTileIdx. If bmpdu_attribute_full_occupancy_flag[tileID][patchIdx][attrIdx][attrTileIdx] is equal to 0, the patch with index patchIdx in the current atlas tile, with tile ID equal to tileID, will occupy only part of the attribute video with index attrIdx and attribute tile index attrTileIdx. If bmpdu_attribute_full_occupancy_flag[tileID][patchIdx][attrIdx][attrTileIdx] is not present, it is assumed to be 1. bmpdu_attribute_2d_pos_x [tileID][patchIdx][attrIdx][attrTileIdx] specifies the x-coordinate of the top-left corner of the bounding box size for the patch with index patchIdx in the current atlas tile, with tile ID equal to tileID, and with attribute video index equals to attrIdx and attribute tile index equal to attrTileIdx. When bmpdu_attribute_2d_pos_x[tileID][patchIdx][attrIdx][attrTileIdx] is not present, its values is inferred to be equal to TileOffsetXAttr[attrTileIdx]. bmpdu_attribute_2d_pos_y [tileID][patchIdx][attrIdx][attrTileIdx] specifies the y-coordinate of the top-left corner of the bounding box size for the patch with index patchIdx in the current atlas tile, with tile ID equal to tileID, and with attribute video index equals to attrIdx and attribute tile index equal to attrTileIdx. When bmpdu_attribute_2d_pos_y[tileID][patchIdx][attrIdx][attrTileIdx] is not present, its values is inferred to be equal to TileOffsetYAttr[attrTileIdx]. bmpdu_attribute_2d_size_x_minus1[tileID][patchIdx][attrIdx][attrTileIdx] plus 1 specifies the width value of the bounding box size for the patch with index patchIdx in the current atlas tile, with tile ID equal to tileID, and with attribute video index equals to attrIdx and attribute tile index equal to attrTileIdx. When bmpdu_attribute_2d_size_x_minus1[tileID][patchIdx][attrIdx] [attrTileIdx] is not present, its values is inferred to be equal to TileWidthAttr[attrTileIdx]. bmpdu_attribute_2d_size_y_minus1[tileID][patchIdx][attrIdx][attrTileIdx] plus 1 specifies the height value of the bounding box size for all the sub-patches present in the patch with index patchIdx in the current atlas tile, with tile ID equal to tileID, and with attribute video index equals to attrIdx and attribute tile index equal to attrTileIdx. When bmpdu_attribute_2d_size_y_minus1[tileID][patchIdx][attrIdx][attrTileIdx] is not present, its values is inferred to be equal to TileHeightAttr[attrTileIdx] bmpdu_faceID_to_subPatchIdx_identity_mapping_flag[tileID][patchIdx] equal to 1 specifies that the identity mapping will be used for faceID and sub-patch index in the patch with index patchIdx in the current atlas tile, with tile ID equal to tileID. If bmpdu_faceID_to_subPatchIdx_identify_mapping_flag[tileID][patchIdx] is equal to 0, the mapping between faceID and sub-patch index will be signalled in the base mesh patch data unit. If bmpdu_faceID_to_subPatchIdx_identify_mapping_flag[tileID][patchIdx] is not present, it is assumed to be 1. bmpdu_projection_texcoord_frame_scale[tileID][patchIdx] indicates the value of the frame scale variable TexCoordProjectionFrameScale[tileID][patchIdx], for the patch with index patchIdx in the current atlas tile, with tile ID equal to tileID. The variable TexCoordProjectionFrameScale[tileID][patchIdx] is used for texture coordinate derivation from geometry projection. bmpdu_projection_texcoord_faceID_count_minus1[tileID][patchIdx] plus 1 indicates the number of face IDs present in the patch, for the patch with index patchIdx in the current atlas tile, with tile ID equal to tileID. bmpdu_faceID_to_subPatchIdx[tileID][patchIdx][i] specifies the faceID for the sub-patch with index i, in the patch with index patchIdx in the current atlas tile, with tile ID equal to tileID, and with submesh index equals to smIdx. If bmpdu_faceID_to_subPatchIdx[tileID][patchIdx][i] is not present, it is assumed to be equal to i. bmpdu_projection_texcoord_projection_id[tileID][patchIdx][i] specifies the values of the projection mode and of the index of the normal to the projection plane for the sub-patch present in the patch with index patchIdx in the current atlas tile, with tile ID equal to tileID, for the sub-patch with index i. The value of bmpdu_projection_texcoord_projection_id[tileID][patchIdx] [i] shall be in range of 0 to asps_max_number_projections_minus1, inclusive. The number of bits used to represent bmpdu_projection_texcoord_projection_id[tileID][patchIdx] [i] is Ceil (Log 2(asps_max_number_projections_minus1+1)). When bmpdu_projection_texcoord_projection_id[tileID][patchIdx][i] is not present, its value is inferred to be equal to 0. bmpdu_projection_texcoord_orientation_id[tileID][patchIdx][i] specifies the orientation index for the sub-patch present in the patch with index patchIdx in the current atlas tile, with tile ID equal to tileID, for the sub-patch index i, used to determine the sub-patch rotation homography transform that are to be used to transform the vertex's 3D space coordinates into texture coordinates (u, v). When bmpdu_projection_texcoord_orientation_id[tileID][patchIdx] [i] is not present, its values is inferred to be equal to 0. bmpdu_projection_texcoord_2d_pos_x[tileID][patchIdx][i] specifies the x-coordinate of the top-left corner of the sub-patch bounding box size for the sub-patch present in the patch with index patchIdx in the current atlas tile, with tile ID equal to tileID, for the sub-patch with index i. When bmpdu_projection_texcoord_2d_pos_x[tileID][patchIdx][i] is not present, its values is inferred to be equal to 0. bmpdu_projection_texcoord_2d_pos_y[tileID][patchIdx][i] specifies the y-coordinate of the top-left corner of the sub-patch bounding box size for sub-patch present in the patch with index patchIdx in the current atlas tile, with tile ID equal to tileID, for the sub-patch with index i. When bmpdu_projection_texcoord_2d_pos_y[tileID][patchIdx][i] is not present, its values is inferred to be equal to 0. bmpdu_projection_texcoord_2d_size_x_minus1[tileID][patchIdx][i] plus 1 specifies the width value of the sub-patch bounding box size for the sub-patch present in the patch with index patchIdx in the current atlas tile, with tile ID equal to tileID, and with submesh index equals to smIdx, for the sub-patch with index i. When bmpdu_projection_texcoord_2d_size_x_minus1[tileID][patchIdx][i] is not present, its values is inferred to be equal to TexCoordProjectionWidth[i]−1. bmpdu_projection_texcoord_2d_size_y_minus1[tileID][patchIdx][i] plus 1 specifies the height value of the sub-patch bounding box size for the sub-patch present in the patch with index patchIdx in the current atlas tile, with tile ID equal to tileID, for the sub-patch associated with index i. When bmpdu_projection_texcoord_2d_size_y_minus1[tileID][patchIdx][i] is not present, its values is inferred to be equal to TexCoordProjectionHeight[i]−1. bmpdu_projection_texcoord_scale_present_flag[tileID][patchIdx][i] equal to 1 specifies that the sub-patch scale is present for the sub-patch present in the patch with index patchIdx in the current atlas tile, with tile ID equal to tileID, for the sub-patch with index i. If bmpdu_projection_texcoord_scale_present_flag[tileID][patchIdx][i] is equal to 0, no sub-patch scale information is present. If bmpdu_projection_texcoord_scale_present_flag[tileID] [patchIdx][i] is not present, it is assumed to be 0. bmpdu_projection_texcoord_subpatch_scale_power_factor[tileID][patchIdx][i] if present, specifies the scaling power factor for the sub-patch present in the patch with index patchIdx in the current atlas tile, with tile ID equal to tileID, for the sub-patch with index i, SubPatchScalingFactor[tileID][patchIdx][i], as follows:

```
SubPatchScalingFactor[ tileID ][ patchIdx ][ i ] = FrameScale[ tileID ][ patchIdx ]
scalePF = bmpdu_projection_texcoord_subpatch_scale_power_factor[ tileID ][ patchIdx ][ i ]
    for( i = 0; i <= scalePF; i++)
        SubPatchScalingFactor[ tileID ][ patchIdx ][ i ] *= TexCoordProjectionScaleFactor
```

-continued

```
If bmpdu_projection_texcoord_subpatch_scale[ tileID ][ patchIdx ][ i ] is not present, then the
SubPatchScalingFactor[ tileID ][ patchIdx ][ i ] is equal to the FrameScale[ tileID ][ patchIdx ]
```

Decoding Process for Base Mesh Patch Data Units Coded
Inputs to the process are the current patch ID, p, and the current tile ID, and tileID. The following base mesh patch related variables are assigned given the parsed elements in the base mesh patch data unit:

```
TilePatchType[ tileID ][ p ] = MESH
TilePatchSubMeshID[ tileID ][ p ] = bmpdu_submesh_id[ tileID ][ p ]
smIdx = SubMeshIDToIndex[ TilePatchSubMeshID[ tileID ][ p ] ]
if(bmpdu_geometry_full_occupancy_flag[ tileID ][ patchIdx ]){
   TilePatch2dPosX[ tileID ][ p ] = TileOffsetX[ tileID ]
   TilePatch2dPosY[ tileID ][ p ] = TileOffsetY[ tileID ]
   TilePatch2dSizeX[ tileID ][ p ] = TileWidth[ tileID ]
   TilePatch2dSizeY[ tileID ][ p ] = TileHeight[ tileID ]
} else {
   TilePatch2dPosX[ tileID ][ p ] = bmpdu_geometry_2d_pos_x[ tileID ][ p ]
   TilePatch2dPosY[ tileID ][ p ] = bmpdu_geometry_2d_pos_y[ tileID ][ p ]
   TilePatch2dSizeX[ tileID ][ p ] = bmpdu_geometry_2d_size_x_minus1[ tileID ][ p ] + 1
   TilePatch2dSizeY[ tileID ][ p ] = bmpdu_geometry_2d_size_y_minus1[ tileID ][ p ] + 1
}
for( i = 0; i < asps_vdmc_num_attribute_video; i++ ) {
   if(bmpdu_attribute_patch_present_flag[ tileID ][ p ][ i ]){
      TilePatchAttrTileID[ tileID ][ p ][ i ] =
            bmpdu_attribute_tile_id[ tileID ][ p ][ i ]
      attrTileIdx = TileIDToIndexAtt[ TilePatchAttrTileID[ tileID ][ p ][ i ] ]
      if(bmpdu_attribute_full_occupancy_flag[ tileID ][ p ][ i ][ attrTileIdx ]){
         TilePatchAttribute2dPosX[ tileID ][ p ][ i ][ attrTileIdx ] =
               TileOffsetXAttr[ attrTileIdx ]
         TilePatchAttribute2dPosY[ tileID ][ p ][ i ][ attrTileIdx ] =
               TileOffsetYAttr[ attrTileIdx ]
         TilePatchAttribute2dSizeX[ tileID ][ p ][ i ][ attrTileIdx ] =
               TileWidthAttr[ attrTileIdx ]
         TilePatchAttribute2dSizeY[ tileID ][ p ][ i ][ attrTileIdx ] =
               TileHeightAttr[ attrTileIdx ]
      } else {
         TilePatchAttribute2dPosX[ tileID ][ p ][ i ][ attrTileIdx ] =
            bmpdu_attribute_2d_pos_x[ tileID ][ p ][ i ][ attrTileIdx ]
         TilePatchAttribute2dPosY[ tileID ][ p ][ i ][ attrTileIdx ] =
            bmpdu_attribute_2d_pos_y[ tileID ][ p ][ i ][ attrTileIdx ]
         TilePatchAttribute2dSizeX[ tileID ][ p ][ i ][ attrTileIdx ] =
            bmpdu_attribute_2d_size_x_minus1[ tileID ][ p ][ i ][ attrTileIdx ] + 1
         TilePatchAttribute2dSizeY[ tileID ][ p ][ i ][ attrTileIdx ] =
            bmpdu_attribute_2d_size_y_minus1[ tile[D ][ p ][ i ][ attrTileIdx ] + 1
      }
   }
}
``` afps_vdmc_ext_projection_textcoord_present_flag[smIdx] is equal to 1, the following applies:

```
TilePatchFrameScale[ tileID ] [ p ] =
   bmpdu_projection_texcoord_frame_scale[ tileID ][ p ]
TilePatchNumSubPatches[ tileID ] [ p ] =
   bmpdu_projection_textcoord_subpatch_count_minus_1[ tileID ][ p ] + 1
for( idx = 0; idx < TilePatchNumSubPatches[ tileID ][ p ]; idx++ ){
   if( bmpdu_faceID_to_subPatchIdx_identity_mapping_flag[ tileID ][ p ])
      i = bmpdu_faceID_to_subPatchIdx[ tileID ][ p ][ idx ]
   else
      i = idx
   TilePatchSubPatchProjectionID[ tileID ][ p ][ i ] =
      bmpdu_projection_textcoord_projection_id[ tileID ][ p ][ i ]
   TilePatchSubPatchOrientationID[ tileID ][ p ][ i ] =
      bmpdu_projection_textcoord_orientation_id[ tileID ][ p ][ i ]
   TilePatchSubPatch2dPosX[ tileID ][ i ][ p ] =
      bmpdu_projection_textcoord_2d_pos_x[ tileID ][ p ][ i ]
   TilePatchSubPatch2dPosY[ tileID ][ p ][ i ] =
      bmpdu_projection_textcoord_2d_pos_y[ tileID ][ p ][ i ]
   TilePatchSubPatch2dSizeX[ tileID ][ p ][ i ] =
      ( bmpdu_projection_textcoord_2d_size_x_minus1[ tileID ][ p ][ i ] + 1 )
   TilePatchSubPatch2dSizeY[ tileID ][ p ][ i ] =
```

-continued

```
    ( bmpdu_projection_textcoord_2d_size_y_minus1[ tileID ][ p ][ i ] + 1 )
  TilePatchSubPatchScale[ tileID ][ p ][ i ] =
      SubPatchScalingFactor[ tileID ][ p ][ i ]
}
```

Use Case Examples

The new syntax allows the coding of different scenarios as well. For instance, the syntax allows the patch to only use a couple of different attribute images, a new aspect in V-DMC.

Figure 2:
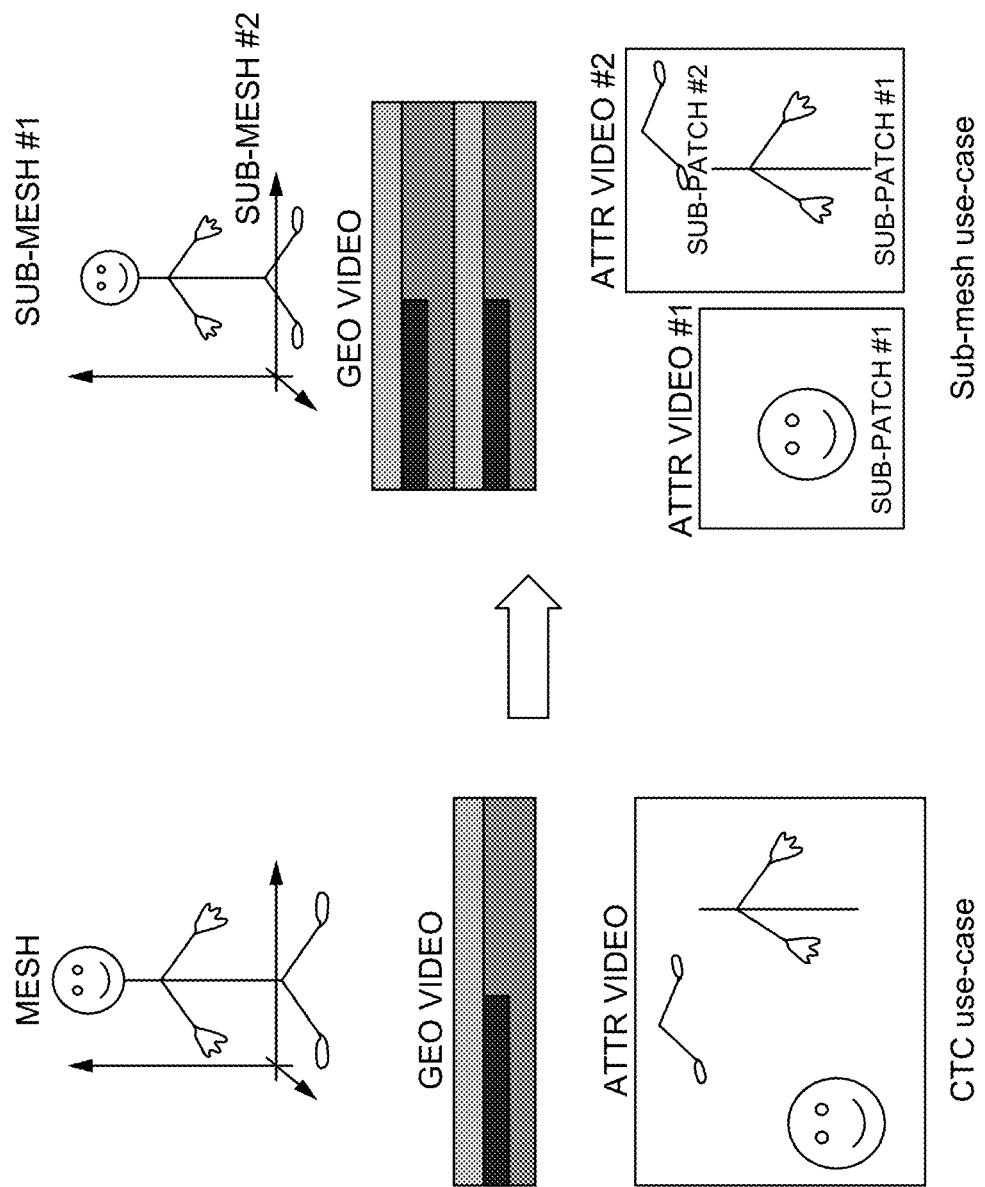
FIG. 2 illustrates a diagram of a use case where patches are defined for different attribute videos combined with sub-meshes according to some embodiments.

FIG. 2 illustrates a diagram of a use case where patches are defined for different attribute videos combined with sub-meshes according to some embodiments.

The CTC condition shown in FIG. 2 may use the following values for the base mesh patch data unit:

|  | Descriptor | Value |
|---|---|---|
| basemesh_patch_data_unit( tileID, patchIdx ) { | | |
|   bmpdu_submesh_id[ tileID ][ patchIdx ] | u(v) | 0 |
|   smIdx = SubMeshIDToIndex[ bmpdu_submesh_id[ tileID ] [ patchIdx ] ] | | |
|   bmpdu_geometry_full_occupancy_flag[ tileID ][ patchIdx ] | u(1) | 1 |
|   for(attrIdx = 0; attrIdx < asps_vdmc_ext_num_attribute_video; attrIdx++ ){ | | |
|     bmpdu_attribute_patch_present_flag[ tileID ] [ patchIdx ][ attrIdx ] | u(1) | 1 |
|     if( bmpdu_attribute_patch present_flag[ tileID ] [ patchIdx ][ attrIdx ] ){ | | |
|       bmpdu_attribute_tile_id[ tileID ][ patchIdx ][ attrIdx ] | u(v) | — |
|       attrTileIdx = TileIDToIndexAtt[bmpdu_attribute_tile_id[ tileID ][ patchIdx ][ attrIdx ]] | | |
|       bmpdu_attribute_full_occupancy_flag[ tileID ][ patchIdx ][ attrTileIdx ] | u(1) | 1 |
|     } | | |
|   } | | |
| } | | |

The case using multiple attributes and sub-meshes shown in FIG. 2 can have the following values for the patch of sub-mesh 1, for example:

|  | Descriptor | Value |
|---|---|---|
| basemesh_patch_data_unit( tileID, patchIdx ) { | | |
|   bmpdu_submesh_id[ tileID ][ patchIdx ] | u(v) | 1 |
|   smIdx = SubMeshIDToIndex[ bmpdu_submesh_id[ tileID ][ patchIdx ] ] | | |
|   bmpdu_geometry_full_occupancy_flag[ tileID ][ patchIdx ] | u(1) | 0 |
|   if( !bmpdu_geometry_full_occupancy_flag[ tileID ][ patchIdx ] ){ | | |
|     bmpdu_geometry_2d_pos_x[ tileID ][ patchIdx ] | ue(v) | 0 |
|     bmpdu_geometry_2d_pos_y[ tileID ][ patchIdx ] | ue(v) | 0 |
|     bmpdu_geometry_2d_size_x_minus1[ tileID ][ patchIdx ] | ue(v) | W-1 |
|     bmpdu_geometry_2d_size_y_minus1[ tileID ][ patchIdx ] | ue(v) | H/2-1 |
|   } | | |
|   for(attrIdx = 0; attrIdx < asps_vdmc_ext_num_attribute_video; attrIdx++ ){ | | |
|     bmpdu_attribute_patch_present_flag[ tileID ][ patchIdx ][ attrIdx ] | u(1) | 1/0 |
|     if( bmpdu_attribute_patch_present_flag[ tileID ][ patchIdx ][ attrIdx ] ){ | | |
|       bmpdu_attribute_tile_id[ tileID ][ patchIdx ][ attrIdx ] | u(v) | — |
|       attrTileIdx = TileIDToIndexAtt[bmpdu_attribute_tile_id[ tileID ][ patchIdx ][ attrIdx ]] | | |
|       bmpdu_attribute_full_occupancy_flag[ tileID ][ patchIdx ][ attrTileIdx ] | u(1) | 1 |
|     } | | |
|   } | | |
| } | | | and the following patch for sub-mesh 2, for example:

|  | Descriptor | Value |
|---|---|---|
| basemesh_patch_data_unit( tileID, patchIdx ) { | | |
|   bmpdu_submesh_id[ tileID ][ patchIdx ] | u(v) | 2 |
|   smIdx = SubMeshIDToIndex[ bmpdu_submesh_id[ tileID ][ patchIdx ] ] | | |
|   bmpdu_geometry_full_occupancy_flag[ tileID ][ patchIdx ] | u(1) | 0 |
|   if( !bmpdu_geometry_full_occupancy_flag[ tileID ][ patchIdx ] ){ | | |
|     bmpdu_geometry_2d_pos_x[ tileID ][ patchIdx ] | ue(v) | 0 |
|     bmpdu_geometry_2d_pos_y[ tileID ][ patchIdx ] | ue(v) | H/2 |
|     bmpdu_geometry_2d_size_x_minus1[ tileID ][ patchIdx ] | ue(v) | W-1 |
|     bmpdu_geometry_2d_size_y_minus1[ tileID ][ patchIdx ] | ue(v) | H/2-1 |
|   } | | |
|   for(attrIdx = 0; attrIdx < asps_vdmc_ext_num_attribute_video; attrIdx++ ){ | | |
|     bmpdu_attribute_patch_present_flag[ tileID ][ patchIdx ][ attrIdx ] | u(1) | 0/1 |
|     if( bmpdu_attribute_patch_present_flag[ tileID ][ patchIdx ][ attrIdx ] ){ | | |
|       bmpdu_attribute_tile_id[ tileID ][ patchIdx ][ attrIdx ] | u(v) | — |
|       attrTileIdx = TileIDToIndexAtt[bmpdu_attribute_tile_id[ tileID ][ patchIdx ][ attrIdx ] | | |
|       bmpdu_attribute_full_occupancy_flag[ tileID ][ patchIdx ][ attrTileIdx ] | u(1) | 1 |
|     } | | |
|   } | | |
| } | | |

After orthoAtlas texture parameterization to generate coordinates, a color transfer is performed which includes mapping coordinates to colors in an image.

There are several ways of implementing the mapping. For example, a mesh and sub-patches are generated, and they are all inserted into a single attribute video. The attribute video is not divided; rather, it is a single tile. A single patch with three sub-patches is used to transmit the information.

Figure 3:
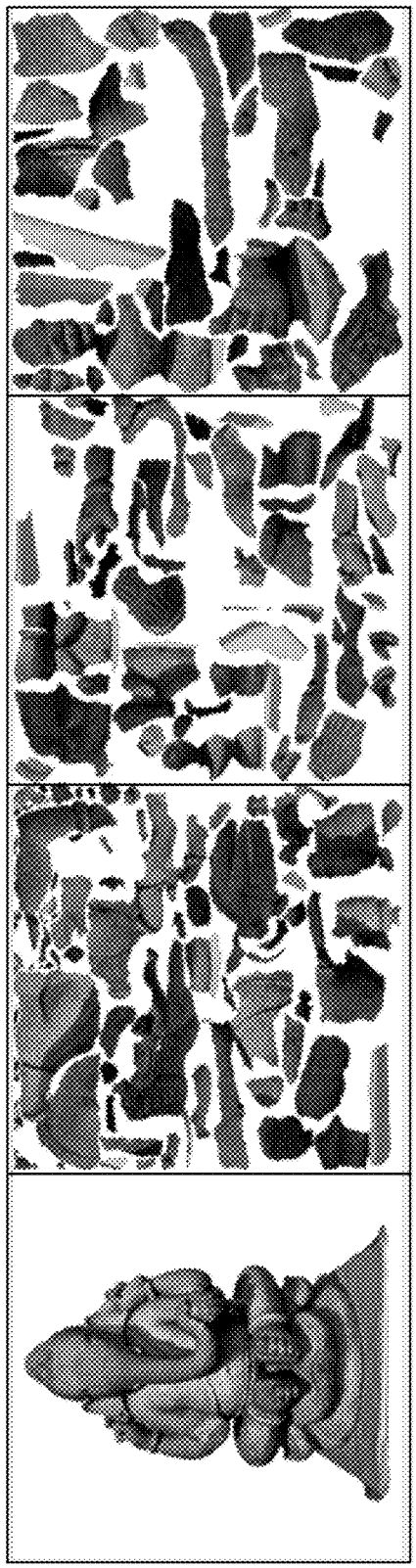
FIG. 3 illustrates images of a multiple attributes use case according to some embodiments.

FIG. 3 illustrates images of a multiple attributes use case according to some embodiments. More than one texture map (e.g., three texture maps) is used to parameterize an entire mesh.

Figure 4:
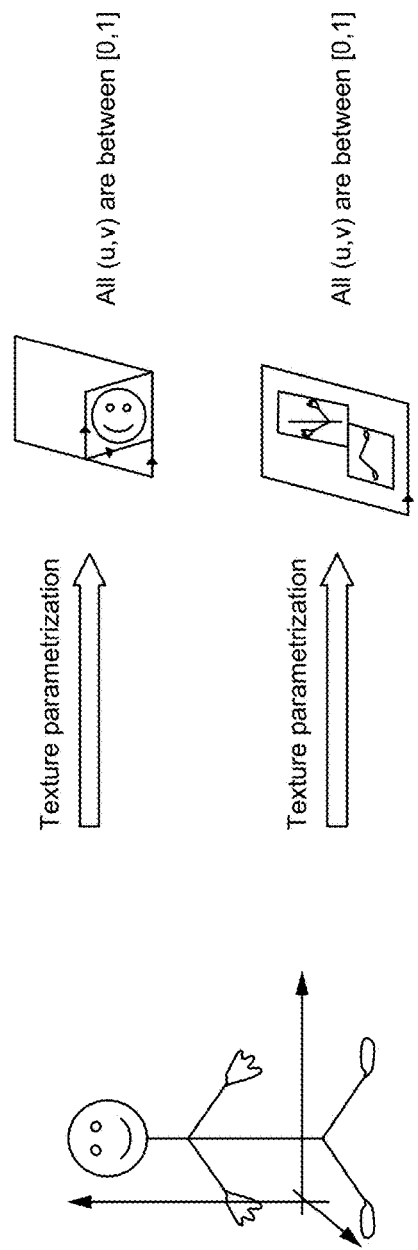
FIG. 4 illustrates a diagram of utilizing sub-meshes according to some embodiments.

FIG. 4 illustrates a diagram of utilizing sub-meshes according to some embodiments. For example, a face is included in one video, and the body is included in another video. A sub-mesh is generated for each one (e.g., face, body).

FIG. 5 illustrates a diagram of color transfer according to some embodiments. The information is able to be put in a single image or in separate images. When the information is included in a single image, there is signaling information as to where each image begins and ends which is able to be implemented using tiles or an explicit dimension sent at the patch level. In some embodiments, separate videos are used instead of tiles. For example, a first video is used for the head, and a second video is used for the body and legs. Two patches are sent-one for attribute video #1 (face) and one for attribute video #2 (body/legs). Furthering the example, specific values are sent such as sub-mesh #0 for the head, mapping of the triangles of the head, patch parameters and other information. For sub-mesh #1 for the body and legs, different information is sent (e.g., since the first video does not have the information, signaling to use the second video which does have the body and legs information is indicated). The information sent is able to include two sub-patches-one for the body and one for the legs.

Figure 6:
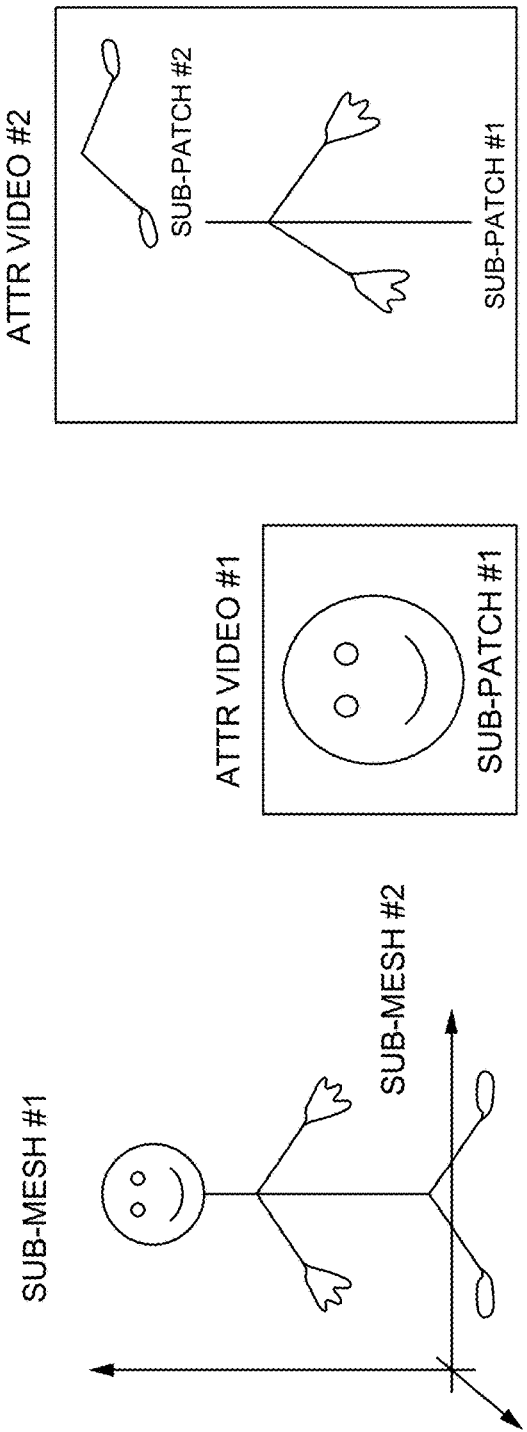
FIG. 6 illustrates a diagram of sub-meshes with corresponding attribute videos according to some embodiments.

FIG. 6 illustrates a diagram of sub-meshes with corresponding attribute videos according to some embodiments. As described, a sub-mesh #1 is a head, and a sub-mesh #2 is a body and legs. Attribute video #1 is of the head with sub-patch #1. Attribute video #2 is of the body including the legs with sub-patch #1 for the body and sub-patch #2 for the legs.

Figure 7:
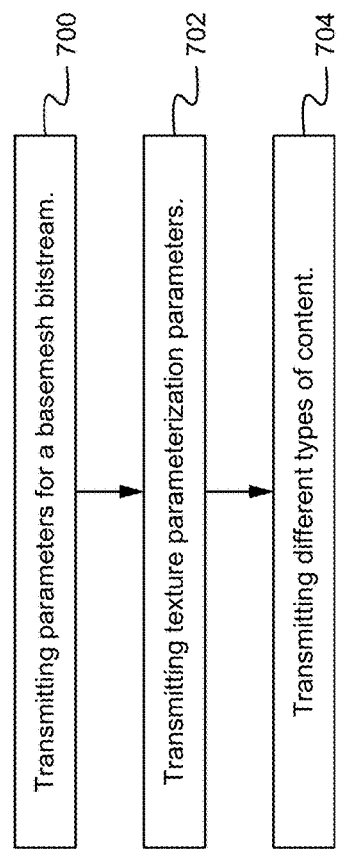
FIG. 7 illustrates a flowchart of a method of implementing the basemesh patch data unit according to some embodiments.

FIG. 7 illustrates a flowchart of a method of implementing the basemesh patch data unit according to some embodiments. In the step 700, parameters for a basemesh bitstream are transmitted. In the step 702, texture parameterization parameters are transmitted (e.g., using sub-patches). In some embodiments, additional information is transmitted as well such as geometry refinement parameters. In the step 704, content of different types is transmitted. For example, point clouds and meshes are able to be transmitted together. Furthering the example, the point clouds and the meshes are able to be mixed together at the patch level. Parts of a mesh in 3D are able to be mapped to single or multiple attribute videos. Content is able to be mixed with legacy V3C patches (e.g., patches for point clouds). When the information is included in a single image, there is signaling information as to where each image begins and ends which is able to be implemented using tiles or an explicit dimension sent at the patch level. In some embodiments, separate videos are used instead of tiles. For example, a first video is used for the head, and a second video is used for the body and legs. Two patches are sent-one for attribute video #1 (face) and one for attribute video #2 (body/legs). Furthering the example, specific values are sent such as sub-mesh #0 for the head, mapping of the triangles of the head, patch parameters and other information. For sub-mesh #1 for the body and legs, different information is sent (e.g., since the first video does not have the information, signaling to use the second video which does have the body and legs information is indicated). The information sent is able to include two sub-patches—one for the body and one for the legs. The parameters and content are able to be transmitted from one device and received by another device (e.g., transmitted by an encoder, and received by a decoder). In some embodiments, fewer or additional steps are implemented. In some embodiments, the order of the steps is modified.

Figure 8:
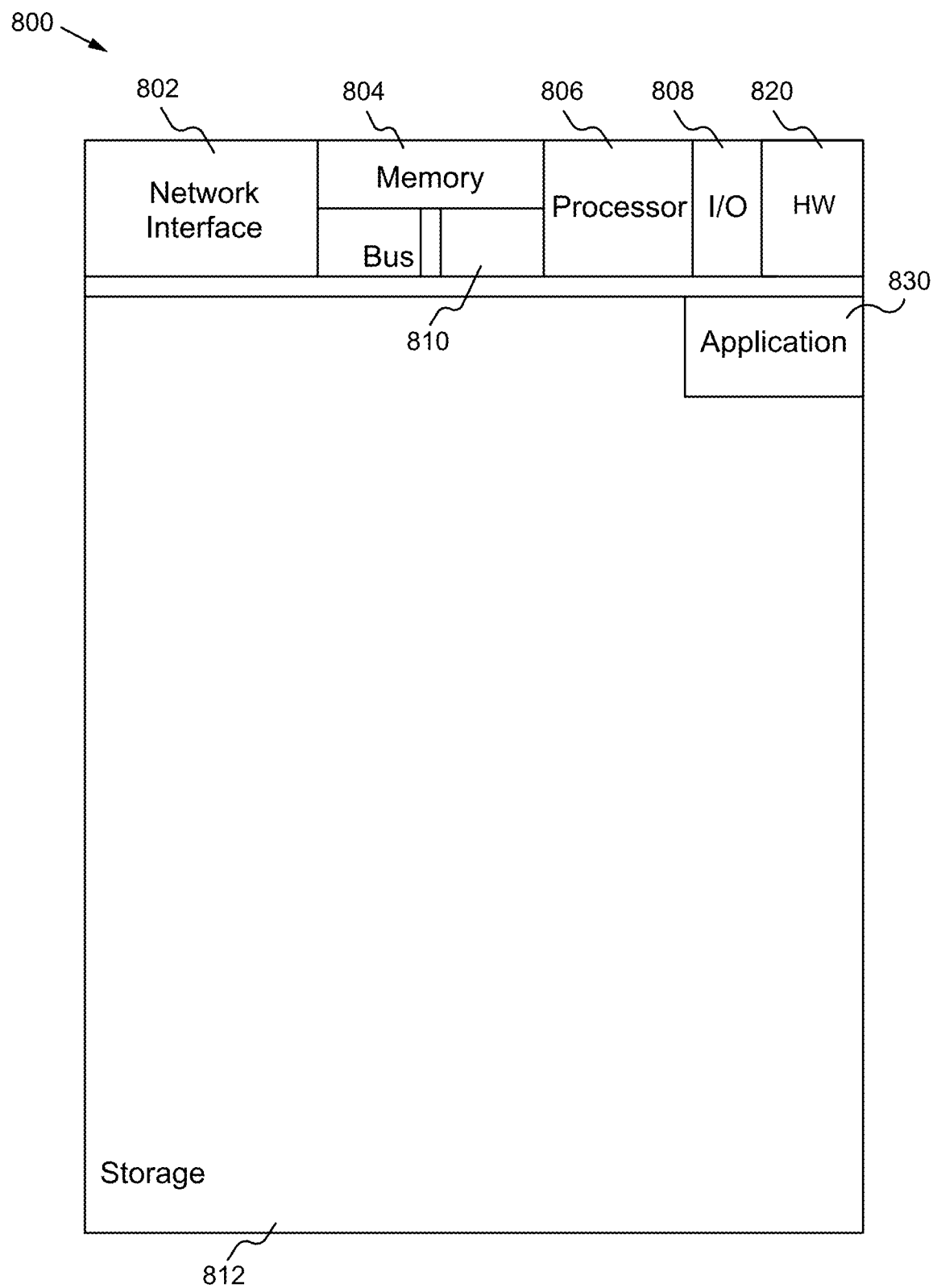
FIG. 8 illustrates a block diagram of an exemplary computing device configured to implement the basemesh patch data unit method according to some embodiments.

FIG. 8 illustrates a block diagram of an exemplary computing device configured to implement the basemesh patch data unit method according to some embodiments. The computing device 800 is able to be used to acquire, store, compute, process, communicate and/or display information such as images and videos including 3D content. The computing device 800 is able to implement any of the encoding/decoding aspects. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Bbasemesh patch data unit application(s) 830 used to implement the basemesh patch data unit implementation are likely to be stored in the storage device 812 and memory 804 and processed as applications are typically processed. More or fewer components shown in FIG. 8 are able to be included in the computing device 800. In some embodiments, basemesh patch data unit hardware 820 is included. Although the computing device 800 in FIG. 8 includes applications 830 and hardware 820 for the basemesh patch data unit implementation, the basemesh patch data unit method is able to be implemented on a computing device in hardware, firmware, software or any combination thereof. For example, in some embodiments, the basemesh patch data unit applications 830 are programmed in a memory and executed using a processor. In another example, in some embodiments, the basemesh patch data unit hardware 820 is programmed hardware logic including gates specifically designed to implement the basemesh patch data unit method.

In some embodiments, the basemesh patch data unit application(s) 830 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the basemesh patch data unit method, a device acquires or receives 3D content (e.g., point cloud content). The basemesh patch data unit method is able to be implemented with user assistance or automatically without user involvement.

In operation, a new high-level syntax for base mesh patch data unit uses the tile information for more efficient metadata coding. Furthermore, it allows the introduction of new use cases, such as defining patches for different attribute videos. The results show gains for bitrate savings for the metadata bitstream, while not negatively affecting the quality at all.

SOME EMBODIMENTS OF V3C SYNTAX NEW BASEMESH PATCH DATA UNIT

1. A method programmed in a non-transitory memory of a device comprising:
   transmitting parameters for a basemesh bitstream;
   transmitting texture parameterization parameters; and
   transmitting content of different types.

2. The method of clause 1 wherein transmitting the texture parameterization parameters includes using sub-patches.

3. The method of clause 1 further comprising transmitting geometry refinement parameters.

4. The method of clause 1 wherein the content of different types include point clouds and meshes.

5. The method of clause 1 further comprising mapping parts of a mesh in 3D to a single attribute video.

6. The method of clause 1 further comprising mapping parts of a mesh in 3D to multiple attribute videos.

7. The method of clause 1 wherein transmitting the content of different types includes transmitting one or more tiles.

8. The method of clause 1 wherein transmitting the content of different types includes transmitting one or more videos.

9. The method of clause 1 wherein transmitting the content of different types includes transmitting a plurality of videos, wherein a first video of the plurality of videos is for a first section of the content, and a second video of the plurality of videos is for a second section of the content.

10. An apparatus comprising:
    a non-transitory memory for storing an application, the application for:
      transmitting parameters for a basemesh bitstream;
      transmitting texture parameterization parameters; and
      transmitting content of different types; and
    a processor coupled to the memory, the processor configured for processing the application.

11. The apparatus of clause 10 wherein transmitting the texture parameterization parameters includes using sub-patches.

12. The apparatus of clause 10 wherein the application is further for transmitting geometry refinement parameters.

13. The apparatus of clause 10 wherein the content of different types include point clouds and meshes.

14. The apparatus of clause 10 wherein the application is further for mapping parts of a mesh in 3D to a single attribute video.

15. The apparatus of clause 10 wherein the application is further for mapping parts of a mesh in 3D to multiple attribute videos.

16. The apparatus of clause 10 wherein transmitting the content of different types includes transmitting one or more tiles.

17. The apparatus of clause 10 wherein transmitting the content of different types includes transmitting one or more videos.

18. The apparatus of clause 10 wherein transmitting the content of different types includes transmitting a plurality of videos, wherein a first video of the plurality of videos is for a first section of the content, and a second video of the plurality of videos is for a second section of the content.

19. A method programmed in a non-transitory memory of a device comprising:
    receiving parameters for a basemesh bitstream;
    receiving texture parameterization parameters; and
    receiving content of different types.

20. The method of clause 19 wherein receiving the texture parameterization parameters includes using sub-patches.

21. The method of clause 19 further comprising receiving geometry refinement parameters.

22. The method of clause 19 wherein the content of different types include point clouds and meshes.

23. The method of clause 19 further comprising mapping parts of a mesh in 3D to a single attribute video.

24. The method of clause 19 further comprising mapping parts of a mesh in 3D to multiple attribute videos.

25. The method of clause 19 wherein receiving the content of different types includes transmitting one or more tiles.

26. The method of clause 19 wherein receiving the content of different types includes transmitting one or more videos.

27. The method of clause 19 wherein receiving the content of different types includes transmitting a plurality of videos, wherein a first video of the plurality of videos is for a first section of the content, and a second video of the plurality of videos is for a second section of the content.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising: transmitting parameters for a basemesh bitstream; transmitting texture parameterization parameters; and transmitting content of different types, wherein transmitting the content of different types includes transmitting a plurality of videos, wherein a first video of the plurality of videos is for a first section of the content, and a second video of the plurality of videos is for a second section of the content.

2. Method of claim 1 wherein transmitting the texture parameterization parameters includes using sub-patches.

3. Method of claim 1 further comprising transmitting geometry refinement parameters.

4. Method of claim 1 wherein the content of different types include point clouds and meshes.

5. Method of claim 1 further comprising mapping parts of a mesh in 3D to a single attribute video.

6. Method of claim 1 further comprising mapping parts of a mesh in 3D to multiple attribute videos.

7. Method of claim 1 wherein transmitting the content of different types includes transmitting one or more tiles.

8. Method of claim 1 wherein transmitting the content of different types includes transmitting one or more videos.

9. An apparatus comprising: a non-transitory memory for storing an application, the application for: transmitting parameters for a basemesh bitstream; transmitting texture parameterization parameters; and transmitting content of different types, wherein transmitting the content of different types includes transmitting a plurality of videos, wherein a first video of the plurality of videos is for a first section of the content, and a second video of the plurality of videos is for a second section of the content; and a processor coupled to the memory, the processor configured for processing the application.

10. Apparatus of claim 9 wherein transmitting the texture parameterization parameters includes using sub-patches.

11. Apparatus of claim 9 wherein the application is further for transmitting geometry refinement parameters.

12. Apparatus of claim 9 wherein the content of different types include point clouds and meshes.

13. Apparatus of claim 9 wherein the application is further for mapping parts of a mesh in 3D to a single attribute video.

14. Apparatus of claim 9 wherein the application is further for mapping parts of a mesh in 3D to multiple attribute videos.

15. Apparatus of claim 9 wherein transmitting the content of different types includes transmitting one or more tiles.

16. Apparatus of claim 9 wherein transmitting the content of different types includes transmitting one or more videos.

17. A method programmed in a non-transitory memory of a device comprising: receiving parameters for a basemesh bitstream; receiving texture parameterization parameters; and receiving content of different types, wherein receiving the content of different types includes receiving a plurality of videos, wherein a first video of the plurality of videos is for a first section of the content, and a second video of the plurality of videos is for a second section of the content.

18. Method of claim 17 wherein receiving the texture parameterization parameters includes using sub-patches.

19. Method of claim 17 further comprising receiving geometry refinement parameters.

20. Method of claim 17 wherein the content of different types include point clouds and meshes.

21. Method of claim 17 further comprising mapping parts of a mesh in 3D to a single attribute video.

22. Method of claim 17 further comprising mapping parts of a mesh in 3D to multiple attribute videos.

23. Method of claim 17 wherein receiving the content of different types includes transmitting one or more tiles.

24. Method of claim 17 wherein receiving the content of different types includes transmitting one or more videos.

* * * * *